(12) United States Patent
Buckingham

(10) Patent No.: US 12,522,045 B2
(45) Date of Patent: Jan. 13, 2026

(54) COOLING SYSTEM FOR COOLING THE BATTERY OF AN ELECTRIC VEHICLE

(71) Applicant: Knorr-Bremse Australia Pty Ltd, Hornsby (AU)

(72) Inventor: Peter Buckingham, Hornsby (AU)

(73) Assignee: Knorr-Bremse Australia Pty Ltd, Hornsby (AU)

( * ) Notice: Subject to any disclaimer, the term of this patent is extended or adjusted under 35 U.S.C. 154(b) by 133 days.

(21) Appl. No.: 18/263,017

(22) PCT Filed: Aug. 9, 2022

(86) PCT No.: PCT/AU2022/050863
§ 371 (c)(1),
(2) Date: Jul. 26, 2023

(87) PCT Pub. No.: WO2023/015339
PCT Pub. Date: Feb. 16, 2023

(65) Prior Publication Data
US 2024/0075787 A1    Mar. 7, 2024

(30) Foreign Application Priority Data

Aug. 10, 2021 (AU) ................................ 2021902477

(51) Int. Cl.
*B60H 1/00* (2006.01)
*B60H 1/32* (2006.01)

(52) U.S. Cl.
CPC ..... *B60H 1/00278* (2013.01); *B60H 1/00392* (2013.01); *B60H 1/323* (2013.01); *B60H 2001/3279* (2013.01)

(58) Field of Classification Search
CPC ........................ B60H 1/00278; B60H 1/00392; B60H 1/323; B60H 2001/3279; B60H 1/143; F25B 7/00
See application file for complete search history.

(56) References Cited

U.S. PATENT DOCUMENTS 11,458,798 B2    10/2022  Lee et al.
2011/0265983 A1*  11/2011  Pedersen ................. F28F 27/02
                                                        165/200

(Continued)

FOREIGN PATENT DOCUMENTS

DE    202005014597 U1 * 12/2005 ............... F24D 3/18
WO    2015/122137 A1     8/2015

(Continued)

OTHER PUBLICATIONS

DE-202005014597-U1 Translation (Year: 2005).*

(Continued)

*Primary Examiner* — David J Teitelbaum
(74) *Attorney, Agent, or Firm* — Finch & Maloney PLLC

(57) ABSTRACT

A cooling system for cooling the battery of an electric vehicle is described including: a primary cooling circuit including a battery and a first heat exchanger, and a pump which circulates a first liquid coolant between the battery and the first heat exchanger; a secondary coolant circuit including an evaporator and a condenser, the evaporator being incorporated into the first heat exchanger, and at least one compressor which circulates a refrigerant fluid between the evaporator and the condenser; and a tertiary cooling circuit including a second heating exchanger and a dry cooler, the condenser being incorporated into the second heat exchanger, and a second pump which circulates a second liquid coolant between the second heat exchanger and the dry cooler.

9 Claims, 3 Drawing Sheets

(56) References Cited

U.S. PATENT DOCUMENTS

| | | | | |
|---|---|---|---|---|
| 2016/0339767 A1* | 11/2016 | Enomoto | ............ | B60H 1/00864 |
| 2018/0312034 A1* | 11/2018 | Koberstein | ........ | B60H 1/00271 |
| 2020/0047586 A1 | 2/2020 | Gonze et al. | | |
| 2021/0362580 A1* | 11/2021 | Pearson | ................... | B60K 1/04 |
| 2022/0097487 A1* | 3/2022 | Jin | ......................... | B60K 11/04 |

FOREIGN PATENT DOCUMENTS

| | | | |
|---|---|---|---|
| WO | 2019/212275 A1 | 11/2019 | |
| WO | 2020/145527 A1 | 7/2020 | |

OTHER PUBLICATIONS

International Search Report Corresponding to PCT/AU2022/050863 mailed Aug. 31, 2022.
Written Opinion Corresponding to PCT/AU2022/050863 mailed Aug. 31, 2022.
International Preliminary Examination Report Corresponding to PCT/AU2022/050863 completed Nov. 9, 2022.

* cited by examiner

COOLING SYSTEM FOR COOLING THE BATTERY OF AN ELECTRIC VEHICLE

TECHNICAL FIELD

The present invention relates to cooling systems for cooling the batteries of electric vehicles and particularly relates to cooling systems for heavy vehicles including mining trucks and freight locomotives

BACKGROUND TO THE INVENTION

Recent improvements in battery technology to increase the electrical energy storage capacity has supported the increasing deployment of electric vehicles. To date, these vehicles have predominantly penetrated the passenger vehicle and light-commercial vehicle market. This is generally because of constraints associated with cooling larger battery packs.

Keeping the battery pack of an electric vehicle cool and within safe working temperature limits is important. The batteries generate internal heat during periods of high vehicle power demand and also during periods of rapid charging. Battery cell temperatures above 60° C. can reduce the power output of the battery as well as causing excessive aging, reducing the cycle life of the cell.

Maintaining the temperature of a battery pack becomes more challenging as the size of the battery pack increases. This has curtailed the use of battery technology to power heavy vehicles.

In the case of mining vehicles, freight locomotives and the like, these are required to carry large payloads and are also commonly required to operate in locations with high ambient temperatures. These additional factors mean that existing battery cooling solutions are inadequate for these applications.

There remains a need for improved systems and techniques to cool battery packs of electric vehicles.

SUMMARY OF THE INVENTION

In a first aspect the present invention provides a cooling system for cooling the battery of an electric vehicle including a primary cooling circuit including a battery and a first heat exchanger, and a pump which circulates a first liquid coolant between the battery and the first heat exchanger; a secondary coolant circuit including an evaporator and a condenser, the evaporator being incorporated into the first heat exchanger, and at least one compressor which circulates a refrigerant fluid between the evaporator and the condenser; and a tertiary cooling circuit including a second heating exchanger and a dry cooler, the condenser being incorporated into the second heat exchanger, and a second pump which circulates a second liquid coolant between the second heat exchanger and the dry cooler.

The system may further include a third heat exchanger which includes first and second flow paths, the first flow path forms part of the primary cooling circuit and the second flow path forms part of the tertiary cooling circuit.

The at least one compressor may be arranged to operate based on the temperature of the coolant in the primary circuit and the ambient temperature.

The cooling system may be arranged to direct fluid in the tertiary circuit to flow through the third heat exchanger based on the temperature of the coolant in the primary circuit and the ambient temperature.

The rate of flow of fluid through the third heat exchanger may be variably controllable.

The system may be further arranged to direct fluid in the tertiary coolant circuit to flow through the second heat exchanger at the lowest ambient temperatures whilst deactivating the at least one compressor.

The rate of flow of fluid through the second heat exchanger may be variably controllable.

The first liquid coolant may be a dielectric fluid.

The second liquid coolant may be a brine or glycol based coolant fluid.

In a second aspect the invention provides a truck including a cooling system according to the first aspect of the invention.

In a third aspect the invention provides a locomotive including a cooling system according to the first aspect of the invention.

In a third aspect the present invention provides a method of retro-fitting a cooling system according to any preceding claim into a vehicle previously powered by an internal combustion engine including the step of utilising the existing internal combustion engine radiator of the vehicle to form the dry cooler of the cooling system for cooling the battery.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
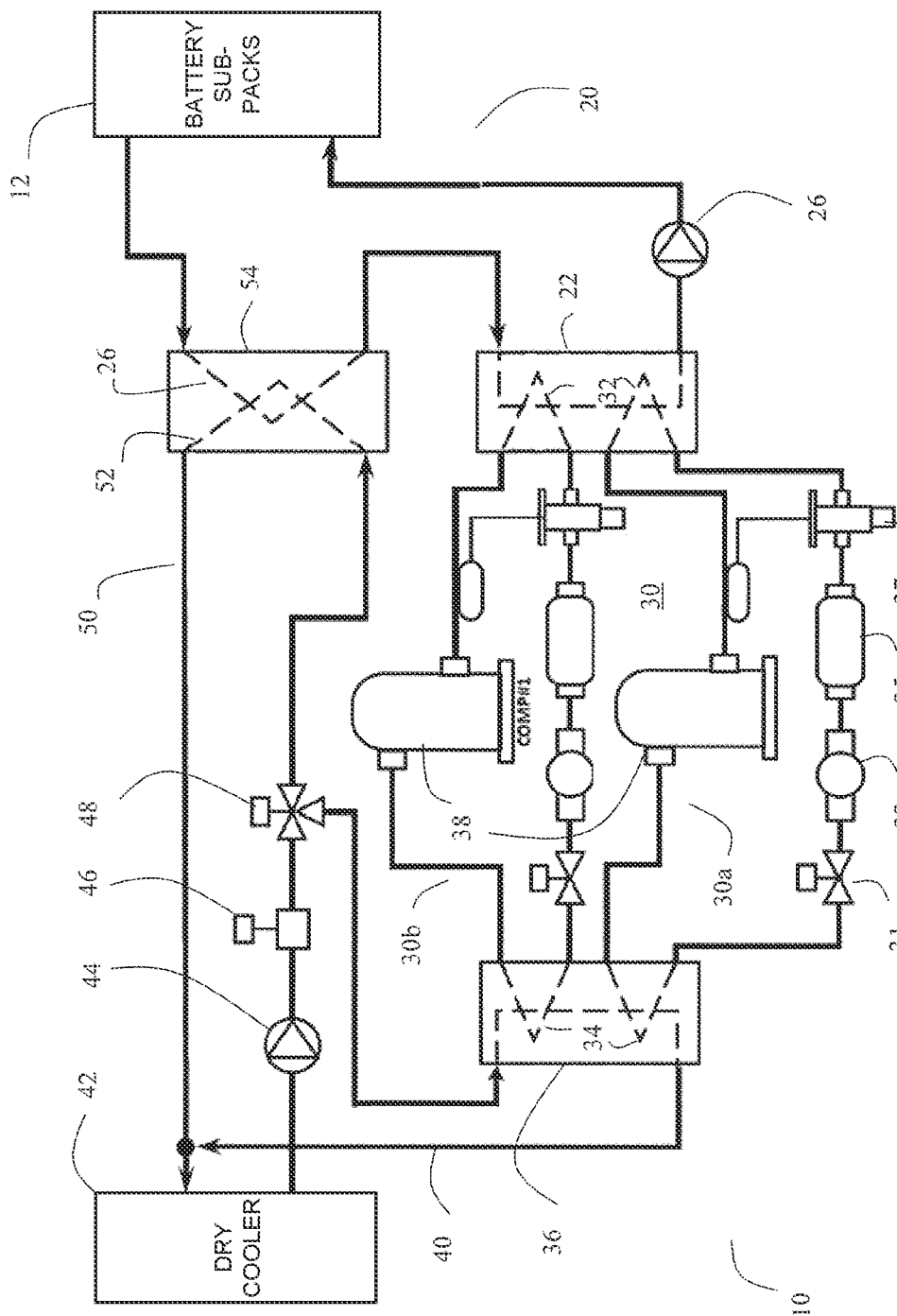
FIG. 1 is schematic diagram of a cooling system for cooling the battery of an electric vehicle.

Referring to FIG. 1, a cooling system 10 is shown for cooling the battery 12 of an electric vehicle. The system 10 is particularly intended for use in cooling the battery of a heavy electric vehicle, such as a vehicle intended for use in mining and freight locomotive operations Battery 12 is provided in the form of a number of interconnected battery sub-packs which are immersively cooled by a first liquid coolant in the form of a dielectric fluid or "E-Fluid" such as Novec™ produced by 3M (www.3m.com) and Thermal Management E-Fluid produced by Castrol (www.castrol.com). The battery 12 forms part of a primary cooling circuit 20 which includes battery 12, a first heat exchanger 22, and a pump 26 which circulates the dielectric fluid between the battery and the first heat exchanger.

System 10 further includes a secondary coolant circuit 30 which is formed from two identical refrigerant circuits 30a, 30b, each including an evaporator coil 32 incorporated into the first heat exchanger 22, and each including a condenser coil 34 which is incorporated into a second heat exchanger 36. Each of the two circuits 30a, 30b of the secondary coolant circuit 30 includes its own compressor 38 which circulates a refrigerant fluid between each evaporator coil 32 and condenser coil 34 via a solenoid valve 31, sight glass 33, drier 35 and a thermostatic expansion valve 37.

The compressors 38 can be individually controlled to operate at variable speeds to regulate the cooling capacity of the secondary coolant circuit 30. They are controlled to vary their speed of operation based on the temperature of the coolant in the primary circuit 20 and also based on the ambient temperature System 10 further includes a tertiary cooling circuit 40 which includes the second heat exchanger 36, a dry cooler 42 and a second pump 44 which circulates a second liquid coolant in the form of a brine or glycol based coolant fluid between the second heat exchanger 32 and the dry cooler 42 via a flow switch 46 and a three-way valve 48.

The three-way valve 48 is operable to control the flow of fluid through a free-cooling portion 50 of the tertiary coolant circuit 40. The free cooling portion 50 includes a third heat exchanger 54 which includes first and second flow paths, the first flow path 26 forms part of the primary cooling circuit 20 and the second flow path 52 forms part of the free cooling portion 50 of the tertiary cooling circuit 40. The three way valve 48 controls flow through the free-cooling portion based on the temperature of the coolant in the primary circuit and the ambient temperature as will be described.

System 10 includes a software driven control system (not shown) which controls the operation of the individual components, being the valves, compressors, and pumps in the system. The software in the control system controls the system according to preprogrammed algorithms and control sequences.

At very low ambient temperatures, the system 10 can control the three-way valve 48 to direct fluid in the tertiary coolant circuit to flow through both of the third heat exchanger 54 and the second heat exchanger 36 whilst the compressors 38 are not operating.

System 10 operates with three separated thermally coupled cooling circuits or "loops". The loops are in thermal contact and provide for separation between the dedicated fluids in each loop.

The primary battery coolant loop 20 is in thermal contact with the battery 12. The battery coolant loop 20 uses a dedicated dielectric e-fluid. The battery coolant loop is in thermal contact with economizer coil 52 (operating as a free-cooler) and evaporator coils 32 (operating as a chiller) connected in series.

The secondary loop 30 is a water-cooled DX refrigerant circuit, operating as a heat-pump, removing heat from the battery coolant loop at the evaporator coils 32 and transferring it to the condenser coils 34.

The tertiary loop 40 is a dry-cooler loop which circulates a "brine" refrigerant in thermal contact with the economizer coil 52 and the condenser coil 34. The dry-cooler fluid absorbs heat at the economizer coil 26, 52 or the condenser coil 34 and rejects the absorbed heat at the dry cooler 42.

In periods of hot to extreme hot temperature conditions (typically above 35° C. to 50° C. ambient temperature) the battery cooling system operates in a refrigeration mode (explained in more detail below with reference to FIG. 2).

In periods of moderate temperature conditions (typically below 32° C. ambient temperature) the battery cooling system operates in a free-cooling mode (explained in more detail below with reference to FIG. 3). At these temperatures, sufficient temperature difference exists between the battery pack and the external ambient for the heat generated by the battery to be transferred to the brine-fluid and then rejected to the atmosphere at the dry cooler 42. Compared to refrigerated mode operation, substantial energy savings can be achieved when the unit is able to operate in free-cooling mode. During free-cooling operation mode, the refrigeration system does not operate (is idle).

During periods of cool and cold temperature conditions (typically below 25° C. ambient temperature) there is excess cooling capacity available from the dry-cooler circuit 40 which may overcool the battery fluid. To prevent overcooling of the battery fluid in colder ambient temperature conditions excess radiator fluid is bled away from the free-cooling coil by three-way valve 48 and diverted away through the idle condenser 36.

The system is a thermal management system that maximises the utilisation of 'free-cooling' operation, and has a mechanical heat-pump system for higher ambient conditions, to remove the heat from the battery and keep the battery pack within upper and lower, safe working temperature limits.

Refrigerated Mode

Figure 2:
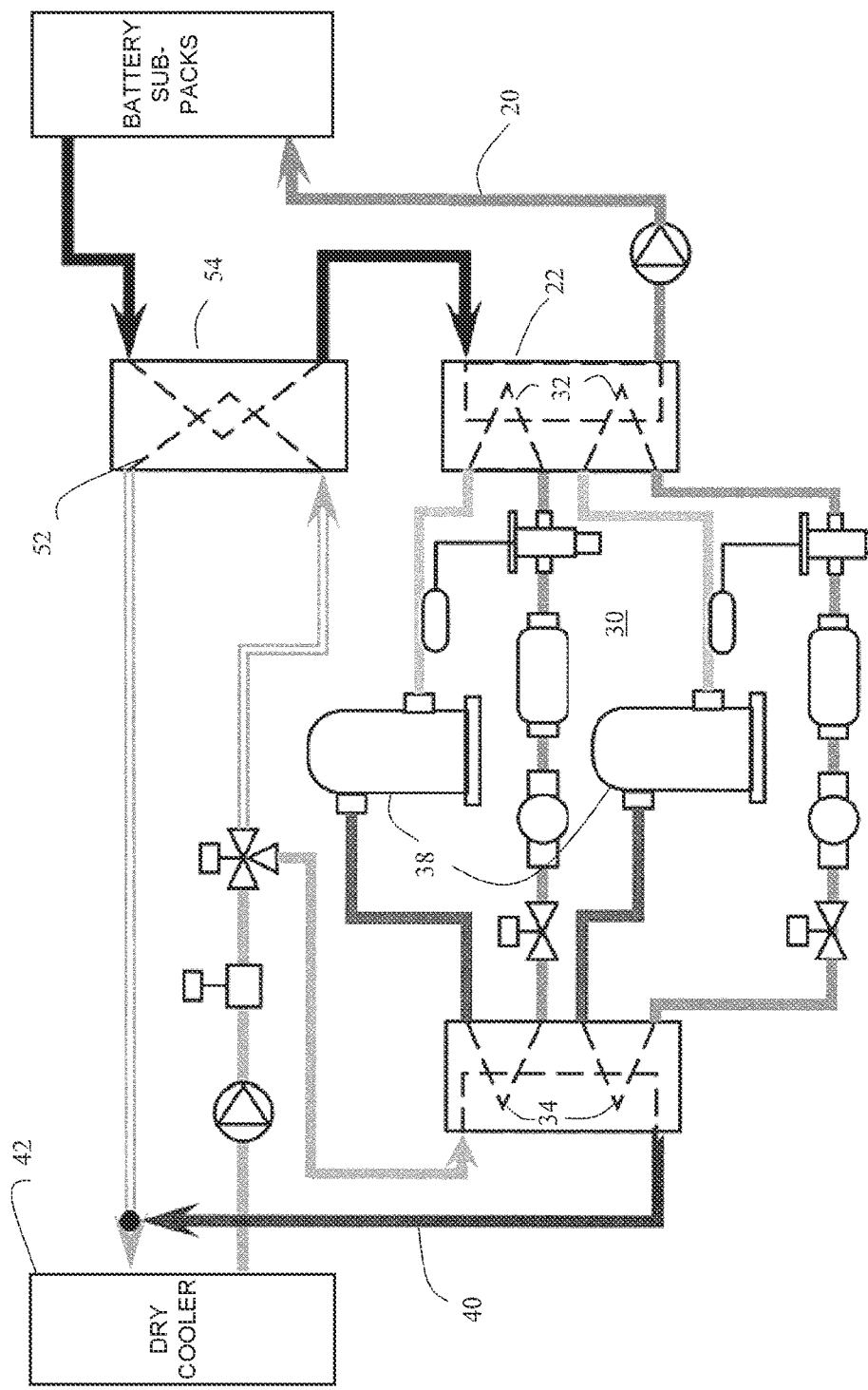
FIG. 2 illustrates the cooling system of FIG. 1 operating in a refrigeration mode.

Referring to FIG. 2, in "refrigerated" mode, the battery heat is "pumped" to the condenser 34 where it is absorbed by the dry-cooler loop 40. The heat is then rejected to the atmosphere at the dry-cooler 42.

In "refrigerated" mode there are three active fluid circuits. The active loops are (1) the battery coolant loop 20, (2) the refrigerated heat-pump loop 30 and (3) the dry-cooler loop 40. In this mode the economizer coil 52 is isolated from the dry-cooler loop by the three-way valve. Before passing by the evaporator coils 32 at first heat exchanger 22 the battery coolant passes by the economizer coil 52 at third heat exchanger 54 without heat transfer.

Temperature and capacity of the battery coolant fluid is controlled by controlling the capacity (number and speed) of the compressors 38. The battery coolant fluid flow rate through the first heat exchanger 22 to pass by the evaporator coils 32 is constant.

Free-Cooling Mode

Figure 3:
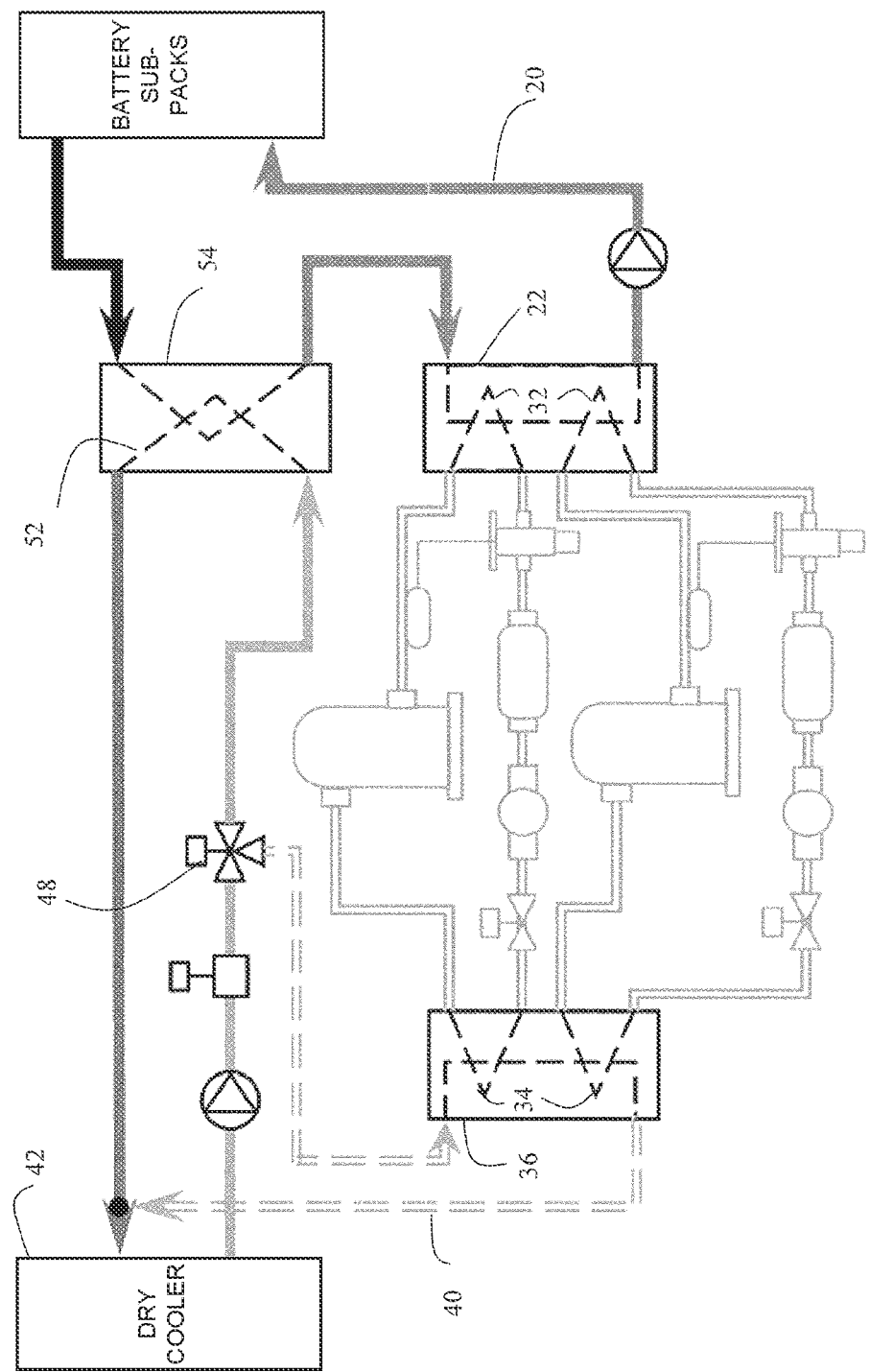
FIG. 3 illustrates the cooling system of FIG. 1 operating in a free-cooling mode.

Referring to FIG. 3, in "economizer" or "free-cooling" mode heat is absorbed from the battery e-fluid at the economizer coil and rejected to the atmosphere at the dry-cooler 42.

In "free-cooling" mode the active fluid circuits are (1) the battery coolant loop and (2) the dry-cooler loop 40.

In "free-cooling" mode temperature and capacity of the battery coolant fluid is controlled by modulating the dry-cooler loop fluid though the economizer coil 52 via the three-way modulating valve 48. At lower ambient temperatures excess dry-cooler fluid is diverted from entering the economizer coil 52 and instead is directed to pass through the second heat exchanger 36 and past the inoperative DX system condenser coils 34. After passing through the third heat exchanger 54 the battery coolant passes by the first heat exchanger 22 and past the evaporator coils 32 without further heat transfer.

In "free-cooling" mode the system thereby modulates the flow of dry-cooler circuit fluid through the economizer coil. The battery coolant fluid flow rate through the first 54 and third heat 22 exchangers is constant.

The control system considers; the deviation to temperature limits within the primary cooling circuit, the performance characteristics of the secondary and tertiary cooling circuits and the ambient temperature in that moment, to formulate an operation mode that may be constantly variable, from 100% free-cooling modulating to 100% active cooling (refrigeration mode), to meet the dynamic battery cooling requirement.

The control system maintains the primary cooling fluid within pre-determined temperature limits, whilst using the method of least power consumption and providing for maximum efficiency.

Embodiments of systems 10 can be retrofitted to vehicles which were manufactured with internal combustion engines. In such a retro-fit, the internal combustion engine is removed to make way for an electric motor and battery packs. The existing radiator of the internal combustion engine forms the dry cooler 42 of system 10.

It can be seen that embodiments of the invention have at least one of the following advantages:

1. Separated Dry-Cooler and Battery-Coolant fluids
Reduces corrosion risk within complex battery cooling jacket structure.
Mitigates impact of "brine" leakage in battery pack and other electronic equipment.
Allows for the optimum coolant to be used within each specific cooling loop
2. Common heat rejection device for free-cool and DX systems
Reduces the number of components.
Reduces frontal surface area required for airflow.
3. Full Battery-Coolant flow rate through heat exchangers
Improves fluid turbulence and heat transfer
Minimises thermal stratification within blended battery coolant
Minimises internal fouling of heat exchanger
4. Minimum power consumption from the Battery Pack
Free cooling of battery pack below a nominal ambient of 32° C.
Active cooling is capacity matched to the battery cooling requirements
No more, no less power is consumed than is required
5. Autonomous control and operation
Cooling system is configurable with any host vehicle.
Fine management of fluid temperature between upper and lower limits.
Reduces the risk of battery thermal runaway Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A cooling system for cooling a battery of an electric vehicle including:
   a primary cooling circuit including the battery and a first heat exchanger, and a pump which circulates a first liquid coolant between the battery and the first heat exchanger;
   a secondary coolant circuit including an evaporator and a condenser, the evaporator being incorporated into the first heat exchanger, and at least one compressor which circulates a refrigerant fluid between the evaporator and the condenser; and
   a tertiary cooling circuit including a second heating exchanger and a dry cooler, the condenser being incorporated into the second heat exchanger, and a second pump which circulates a second liquid coolant between the second heat exchanger and the dry cooler;
   and further including a third heat exchanger which includes first and second flow paths, the first flow path forms part of the primary cooling circuit and the second flow path forms part of the tertiary cooling circuit;
   wherein the cooling system is arranged to direct the second liquid coolant in the tertiary circuit to flow through the third heat exchanger based on a temperature of the first liquid coolant in the primary circuit and the ambient temperature; and
   wherein the cooling system is further arranged to direct the second liquid coolant in the tertiary coolant circuit to flow through the second heat exchanger at low ambient temperatures below 25° C. whilst deactivating the at least one compressor.

2. The cooling system according to claim 1 wherein the at least one compressor is arranged to operate based on a temperature of the coolant in the primary circuit and an ambient temperature.

3. The cooling system according to claim 1, wherein a rate of flow of fluid through the third heat exchanger is variably controllable.

4. The cooling system according to claim 1 wherein the rate of flow of the refrigerant fluid through the second heat exchanger is variably controllable.

5. The cooling system according to claim 1 wherein the first liquid coolant is a dielectric fluid.

6. The cooling system according to claim 1 wherein the second liquid coolant is a brine or glycol based coolant fluid.

7. The cooling system according to claim 1, wherein the vehicle is a truck.

8. The cooling system according to claim 1, wherein the vehicle is a locomotive.

9. A method of retro-fitting a cooling system into an electric vehicle, that was previously powered by an internal combustion engine, the cooling system cooling a battery of the electric vehicle including: a primary cooling circuit including the battery and a first heat exchanger, and a pump which circulates a first liquid coolant between the battery and the first heat exchanger; a secondary coolant circuit including an evaporator and a condenser, the evaporator being incorporated into the first heat exchanger, and at least one compressor which circulates a refrigerant fluid between the evaporator and the condenser; a tertiary cooling circuit including a second heating exchanger and a dry cooler, the condenser being incorporated into the second heat exchanger, and a second pump which circulates a second liquid coolant between the second heat exchanger and the dry cooler; and further including a third heat exchanger which includes first and second flow paths, the first flow path forms part of the primary cooling circuit and the second flow path forms part of the tertiary cooling circuit the method including the step of:
   utilizing the existing internal combustion engine radiator of the vehicle to form the dry cooler of the cooling system for cooling the battery.

* * * * *